Patented May 16, 1933

1,909,295

UNITED STATES PATENT OFFICE

MARTIN LUTHER, OF MANNHEIM, AND HANS WILLE, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

SULPHONATION OF OXIDATION PRODUCTS OF HYDROCARBONS AND THE LIKE

No Drawing. Original application filed August 19, 1926, Serial No. 130,352, and in Germany August 25, 1925. Divided and this application filed December 5, 1927. Serial No. 237,983.

The subject matter of this application has been divided out from our copending application Ser. No. 130,352, filed August 19, 1926, with the express intention of applying for another patent therefor.

We have shown in our said copending application that paraffin hydrocarbons, waxes and similar organic materials of high molecular weight can be completely converted into valuable oxidation products without the formation of valueless by-products by removing the oxidized part from the reaction mixture before the oxidation is finished, and subjecting the non-oxidized part, if desired, in mixture with fresh initial material again to the oxidizing treatment in the manner described. The removal of the oxidation product from the reaction mixture may be effected in any suitable manner. For example the oxidation product may be removed from the reaction mass by heating the latter only to such a high temperature that only the oxidation product which has a lower melting point than the initial material, melts and is removed from the mixture in the liquid state. It is, however, of particular advantage to remove the oxidation products by a treatment with solvents in which the said products are soluble, but in which the non-oxidized or not sufficiently oxidized part of the initial material is insoluble. By this method of working all of the initial material can be converted into a practically homogeneous, highly oxidized, light-colored product.

As solvents suitable for carrying out our present invention we mention, for example, aliphatic alcohols, pyridine or acetone and their homologues. It is often advantageous to employ solvents containing a small amount of water. The process can be carried out in an especially advantageous manner with methanol or mixed solvents containing methanol.

As is well known in the art, for example, from Journal of the Chemical Society 121 (1922) page 496, Berichte der Deutschen Chemischen Gesellschaft, vol. 53 (1920), pages 66, 922 and 1569, and Mitteilungen des Deutschen Forschungsinstitutes fur Testilstoffe 1918, page 108, in the liquid-phase oxidation of paraffin no substantial cracking of the hydrocarbons occurs if the oxidation be carried out below 200° C., and especially when carried only to such an extent that unattacked hydrocarbon material remains, in contrast to the vapour-phase oxidation of volatile hydrocarbons which are considerably cracked and split during this oxidation with a partial condensation of the products of the cleavage. When obtained under the said liquid-phase conditions, the oxygenated products of the liquid-phase oxidation will contain about the same number of carbon atoms as the initial materials, of which paraffin is known to contain hydrocarbons containing from about 12 to 36 carbon atoms, mainly from about 12 to about 24 carbon atoms (compare for example Berichte der Deutschen Chemischen Gesellschaft, vol. 40 (1907), page 4779). In accordance with the said statements water-insoluble fatty acids containing from 10 to about 35 carbon atoms, mainly from 11 to 24 carbon atoms, have been identified in the liquid phase oxidation products from paraffin (according to the aforesaid citations, Chemiker Zeitung 49 (1920), page 311, and Zeitschrift fur angewandte Chemie 1918, page 69). Similarly, alcohols in the said oxidation products contain from about 10 to 25 carbon atoms (see Journal of the Chemical Society 1926, page 2377), lauryl, myristyl, palmityl and stearyl or octodecyl alcohols together with alcohols containing 22, 24 and 25 carbon atoms having been found besides the corresponding myristic, palmitic, isopalmitic, stearic and arachic acids, the alcohols having from about 12 to about 20 carbon atoms constituting generally the predominant portion of the whole mixture of alcohols.

In the said application we have stated that the resulting highly oxidized products are very suitable, inter alia, for example, as substitutes for olein and for the manufacture of textile soaps.

We have now further found that they are also very valuable initial materials for the production of products which are readily soluble in water and have about the character of Turkey red oil. These latter products are obtained according to our present invention by sulphonating the aforesaid oxidation products with the aid of concentrated sulphuric acid.

The following example will further illustrate how our invention may be carried out in practice, but the invention is not limited to this example.

*Example*

Paraffin wax is oxidized by melting the wax and passing therethrough a current of air, the reaction vessel being filled with solid bodies of a large superficial area such as rings of porcelain or like inert material. The oxidation is carried out at about 160° C., care being taken that the temperature does not exceed 180° C. The quantity of air employed is about 100 litres per hour per each 100 grams of paraffin wax and the oxidation is stopped as soon as about 50 per cent of the initial material has been oxidized since otherwise from yellow to brown products are obtained. The reaction mixture is treated at room temperature with about 10 times its weight of methanol. The resulting solution is separated from the non-oxidized part by filtration and evaporation. The residue obtained by evaporation of the solution amounts to about 50 per cent of the initial material and has a saponification number of above 200. The residue insoluble in methanol is mixed with paraffin wax, the mixture is oxidized, again treated with methanol in the manner described above and so forth.

The resulting oxidation product is stirred for 2 hours with one third of its weight of sulphuric acid of 98 per cent strength at 35° C. Thereupon the excess of sulphuric acid is removed by washing with sodium sulphate solution. The resulting product forms stable emulsions with water when mixed with from 3 to 4 times its weight of spindle oil and from 2 to 3 per cent of ammonia.

What we claim is:

1. A process for producing products of the character of Turkey red oil which comprises oxidizing a paraffinic body having a boiling point approaching that of paraffin wax in the liquid phase until about 50% of the initial material is oxidized, separating the unoxidized initial material from the oxidation product and acting on the oxidation product with a sulphonating agent.

2. A process for producing products of the character of Turkey red oil which comprises oxidizing solid paraffin hydrocarbons in the liquid phase until about 50% of the initial material is oxidized, removing the solid unaltered initial material from the solid oxidation product and acting on the oxidation product with a sulphonating agent.

3. A process for producing products of the character of Turkey red oil which comprises oxidixing paraffin wax in the liquid phase until about 50% of the initial material is oxidized, removing the solid unaltered initial material from the solid oxidation product and acting on the oxidation product with a sulphonating agent.

4. A process for producing products of the character of Turkey red oil which comprises oxidizing paraffinic body having a boiling point approaching that of paraffin wax in the liquid phase until about 50% of the initial material is oxidized, separating the unaltered initial material from the oxidation product by treatment of said product with a solvent in which the unaltered initial material is insoluble and treating the oxidized portion of the initial material with a sulphonating agent.

5. A process for producing products of the character of Turkey red oil which comprises oxidizing solid paraffin hydrocarbons in the liquid state until about 50% of the initial material is oxidized, removing the oxidized portion of the initial material by extraction with methanol and acting on said oxidized portion with a sulphonating agent.

6. A composition of matter having soap-like and emulsifying properties, consisting essentially of a mixture of sulphuric acid derivatives of aliphatic acids having from 10 to 35 carbon atoms and sulphuric acid derivatives of aliphatic alcohols having from 10 to 25 carbon atoms, said mixture being obtainable by treatment of the oxidation product of the liquid phase oxidation of paraffin with a sulphonating agent.

7. A composition of matter having soap-like and emulsifying properties, consisting essentially of a mixture of sulphuric acid derivatives of aliphatic acids in which acids containing from 11 to 24 carbon atoms predominate and sulphuric acid derivatives of aliphatic alcohols in which alcohols containing from 12 to 20 carbon atoms predominate, said mixture being obtainable by the treatment of the oxidation product of the liquid phase oxidation of paraffin with a sulphonating agent.

In testimony whereof, we affix our signatures.

MARTIN LUTHER.
HANS WILLE.